United States Patent [19]

Christensen

[11] 4,194,627

[45] Mar. 25, 1980

[54] COLLAPSIBLE AND REUSABLE CONTAINER INSULATOR

[75] Inventor: Robert F. Christensen, Miles City, Mont.

[73] Assignee: Shirley I. Gibson, Miles City, Mont.; a part interest

[21] Appl. No.: 939,118

[22] Filed: Sep. 5, 1978

[51] Int. Cl.² .................... B65D 81/36; B65D 7/00
[52] U.S. Cl. .................... 206/545; 220/4 B; 220/90.2; 220/412; 229/7 S
[58] Field of Search ............ 206/545, 820, 523; 220/4 B, 4 F, 4 R, 410, 412, 90.2; 215/1 A; 229/7 S, 53

[56] References Cited

U.S. PATENT DOCUMENTS

| 1,180,330 | 4/1916 | Spaulding | 229/53 |
|---|---|---|---|
| 2,710,108 | 6/1955 | Zarra | 215/1 A |
| 3,023,922 | 3/1962 | Arrington et al. | 220/412 |
| 3,093,238 | 6/1963 | King | 220/410 |
| 3,155,260 | 11/1964 | Widener | 220/410 |
| 3,473,682 | 10/1969 | Studen | 215/100.5 |
| 3,613,881 | 10/1971 | Oldenburg | 206/820 |
| 3,741,843 | 6/1973 | Louis | 220/4 R |

Primary Examiner—William T. Dixson, Jr.
Attorney, Agent, or Firm—Clarence A. O'Brien; Harvey B. Jacobson

[57] ABSTRACT

A collapsible and reusable beverage container insulator comprising a foldable sleeve of semi-rigid insulating material joinable to a disc-shaped bottom and a hinged top lid shaped to fit the sleeve opening. The sleeve has a lip cut out portion, the top lid being adapted to fit the lip cut out portion when mounted by fastening means to the sleeve.

7 Claims, 8 Drawing Figures

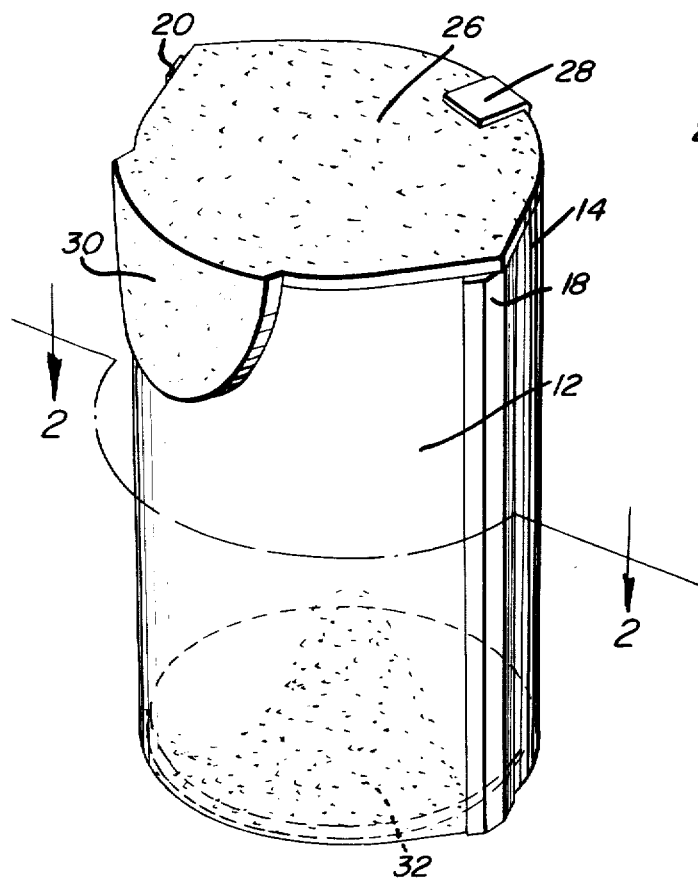
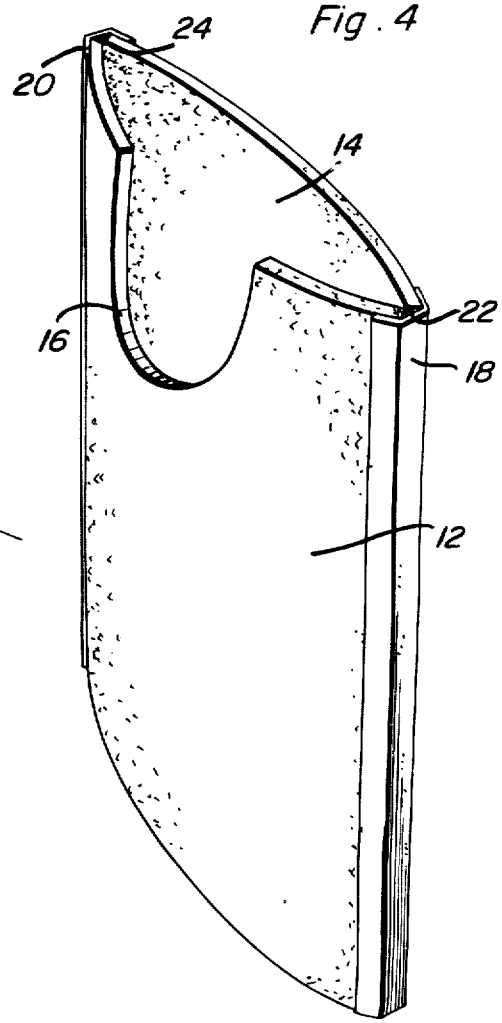
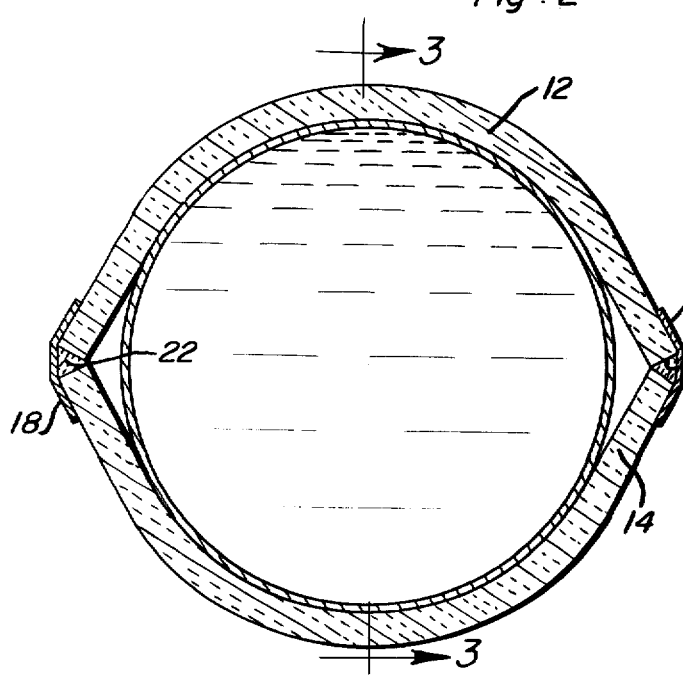
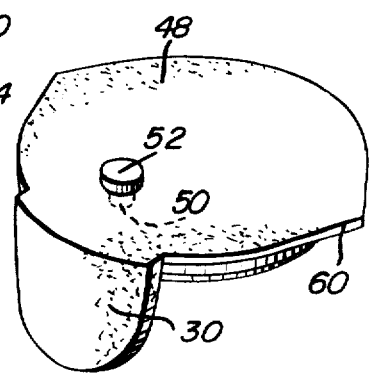

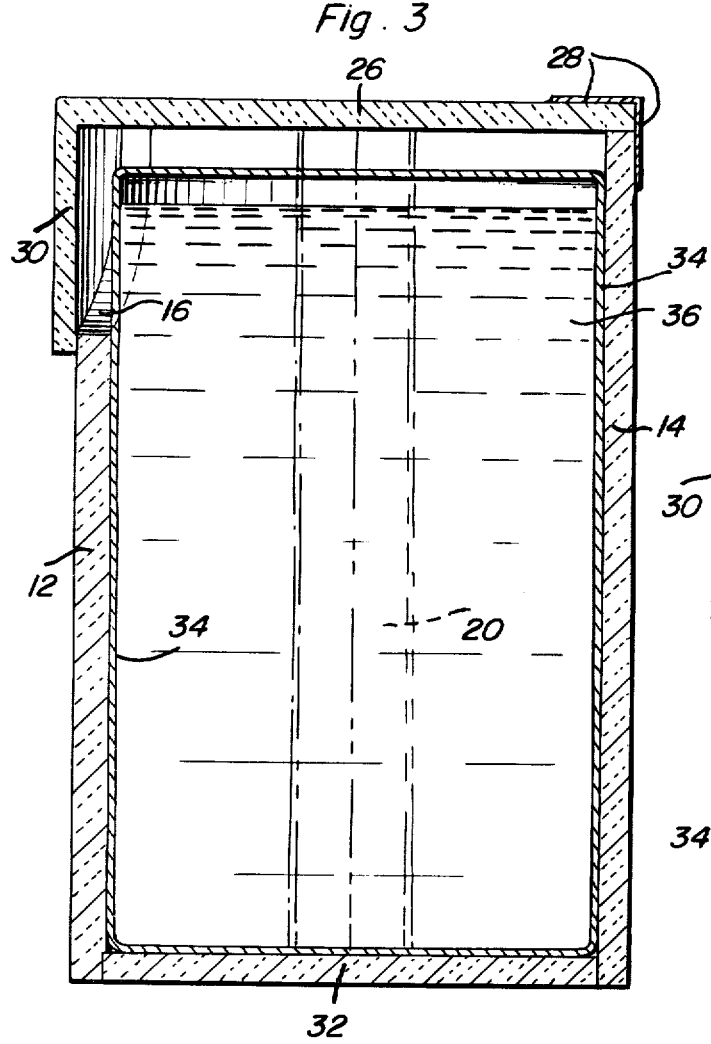
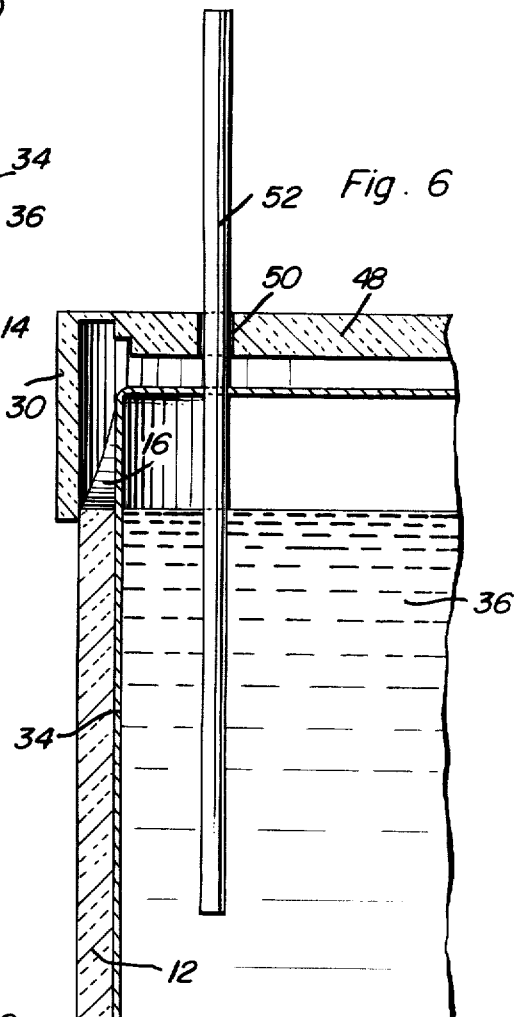
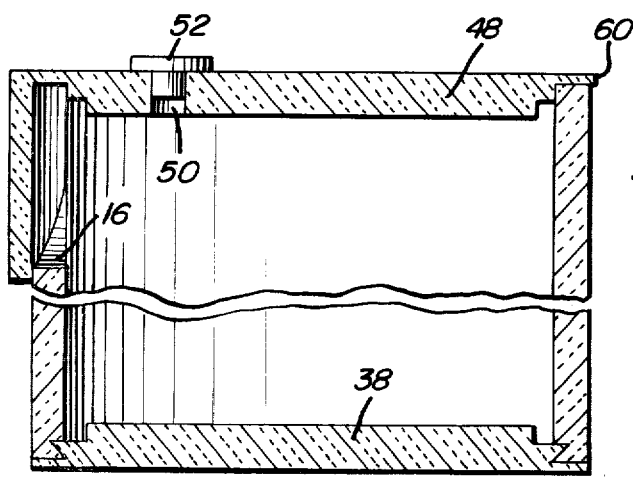
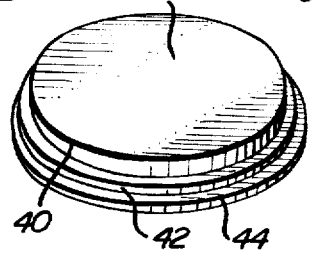

COLLAPSIBLE AND REUSABLE CONTAINER INSULATOR

BACKGROUND OF THE INVENTION

1. Field of the Invention

The invention relates to an enclosing collapsible and reusable container insulator is disclosed constructed to reduce heat flor in relation to the container and thereby retain the container contents as desired temperatures above or below ambient temperatures for a substantially greater period of time than otherwise would result. Utility resides in lengthening this time of thermal adjustment which can be the time required for consumption of the container contents. More particularly, the invention relates to beverage containers holding chilled beverages for consumption by persons several minutes or hours after removal of the chilled beverage contents into surroundings at warmer ambient temperatures.

2. Description of the Prior Art

It is known to provide insulators and holders for beverage containers. For instance, Ghee in U.S. Pat. No. 3,103,295, issued Sept. 10, 1963, shows a beverage can holder with a notch in the holder to provide access to a portion of the periphery of the top of the can. Peters in U.S. Pat. No. 2,936,927, issued May 17, 1960, as well as Munkachy in U.S. Pat. No. 2,936,068, issued May 10, 1960, discloses a holder for containers where the holders can be folded into a substantially flat configuration. Jolly in U.S. Pat. No. 3,257,025, issued June 21, 1966, shows an insulating tumbler with cylindrical side walls surrounding a metallic container to lessen the rate of heat transfer between the container contents and the ambient atmosphere. Pressnell in U.S. Pat. No. 3,719,305, issued Mar. 6, 1973, discloses a holder for a beverage can, the holder including a pivotal lid. The Sadler patent (U.S. Pat. No. 4,040,549, issued Aug. 9, 1977) shows a cup and holder assembly including a cover and a removable bottom surface.

Other patents illustrating the prior art incude the following:

U.S. Pat. No. 3,263,855; Pugh, Sr.; Aug. 2, 1966.
U.S. Pat. No. 3,979,011; Schleicher; Sept. 7, 1976.

SUMMARY OF THE INVENTION

The invention provides a thermal insulator for enclosing a beverage container or other container, the insulator comprising three parts, including side walls collapsible along fold lines, a disc-shaped insulating bottom portion fitting into the lower part of the side walls, and an insulating top lid, attached to the side walls by a hinge tape and having a downwardly projecting tab for insulatingly covering a lip cut out in the upper portion of one of the side walls. When assembled with a compatibly sized container therein, the invention eliminates spillage, excludes foreign matter, retains heat, prevents condensation of moisture, allows insertion of a drinking straw and is reusable with other containers of approximately the same size.

Accordingly, it is an object of the present invention to provide means for maintaining a temperature above or below ambient temperatures in a container by entirely enclosing the container with an insulating material.

Another object of the invention is to provide a container insulator which can be disassembled, is collapsible and reusable.

Still another object of the invention is to provide a beverage container insulator which minimizes absorption of heat from incident solar radiation, and excludes foreign matter during outdoor use.

A further object of the invention is to prevent condensation of moisture when chilled contents are enclosed in the insulator, and to prevent deposition of moisture on a surface, such as a table, as well as to prevent scratching of such a surface.

Yet another object of the invention is to provide an insulator with a portion cut out from the top thereof to fit the lip of the user and prevent leakage of contents into the space between the container and the insulator.

Yet a further object of the invention is to provide an insulator which allows insertion of a straw into a metal can selected from a range of sizes held firmly by the enclosing insulator.

A still further object of the invention is to provide an insulator to save money, save container material, save on ingredients in the container's contents, and add to the pleasure of the consumer.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the assembled insulator as in use.

FIG. 2 is a transverse sectional view of the assembled insulator and enclosed container, taken substantially upon a plane passing along section line 2—2 on FIG. 1.

FIG. 3 is a longitudinal sectional view of the insulator, taken substantially upon a plane passing along section line 3—3 of FIG. 2, showing the insulator as in use, but without an associated container.

FIG. 4 is a perspective view of the collapsed side walls of the insulator.

FIG. 5 is a perspective view of the bottom insulating disc portion of the invention.

FIG. 6 is a fragmentary longitudinal sectional view of a second embodiment of the device wherein the top cover is adapted to receive a drinking straw.

FIG. 7 is a fragmentary longitudinal sectional view of the device adapted to receive a drinking straw, where the aperture for the straw is fitted with a plug.

FIG. 8 is a perspective view of the top portion of the insulator adapted for use with a drinking straw, showing the associated plug.

DESCRIPTION OF THE PREFERRED EMBODIMENTS

An assembled container insulator is shown in FIG. 1 and designated generally by the numeral 10 and comprises foldable side walls 12 and 14 constructed of semi-rigid insulating material in the two halves shown Side wall 12 has a cut-out portion 16 to allow the user to easily drink from the container enclosed within insulator 10. Side walls 12 and 14 are joined with flexible longitudinal insulating strips 18 and 20 with the gap 22 and 24 filled with a soft foam strip of insulation to improve the insulating properties at the junction of side walls 12 and 14. Also shown in FIG. 1 is top insulating lid 26, held to side wall 14 by tape hinge 28 and having lip seal 30 dependingly attached thereto to cover cut-out portion 16.

In the embodiment shown in FIG. 3, bottom disc 32 is frictionally held by side walls 12 and 14 and container 34 holding liquid 36 is also shown thereon. An alternative bottom disc is shown in FIG. 5, where bottom disc 38 is provided with circumferential ridges 40, 42 and 44, middle ridge 42 being undercut to permit a snap fit with side walls 12 and 14. Disc 38 is shown in the embodiment of the invention illustrated in FIG. 6, side wall 12 being shown with a lower gripping kerf 46 for receiving ridge 42. In the embodiment of FIG. 6, a slight modification from top lid 26 is shown with top 48 having straw acceptor hole 50 for receiving drinking straw 52. Straw acceptor hole 50 can be fitted with plug 52, as shown in FIG. 7. Top 48, in association with plug 52, is also shown in FIG. 8.

When side walls 12 and 14, along with top lid 26 and bottom disc 32, to their counterparts in alternate embodiments, are constructed of insulating material with a relatively low thermal conductivity, the result of enclosing container 34 by insulator 10 is to reduce heat transfer from liquid 36 into the ambient surroundings. Accordingly, if liquid 36 is a beverage, such as a carbonated soft drink, beer, or the like, normally consumed at a chilled temperature sustantially below the ambient temperature use of insulator 10 will add to the pleasure and enjoyment of the person consuming the contents of container 34. Moreover, use of insulator 10 will reduce waste because in many instances part of the contents of container 34 are discarded because it becomes so warm that a person prefers not to consume it.

To construct the device of the present invention, the sleeve assembly shown in FIG. 4, comprising side walls 12 and 14, along with longitudinal insulating strips 18 and 20 is constructed of semi-rigid insulating material in two halves. One of the halves has a lip cut-out, shown as cut-out portion 16 in FIG. 4. The two side walls 12 and 14 are joined with flexible insulating strip 22 and 24 in conventional manner.

Top lid 26 is constructed of an insulating material shaped to fit the top opening in side walls 12 and 14 when assembled and place over the enclosed container 34. Top lid 26 also has depending lip seal 30 which extends into or over cut-out portion 16. Tape hinge 28 fastens the rear portion of top lid 26 to side wall 14. Bottom disc 32 is made of insulated material slightly larger than container 34. The springiness or tendency of walls 12 and 14 to collapse when assembled into the sleeve shown in FIG. 4 provides axial gripping force to retain bottom disc 32 by friction.

An alternate embodiment of the top insulator is shown in FIGS. 6, 7 and 8, where a straw acceptor hole for use with a drinking straw or plug is present.

An alternative bottom disc arrangement is shown in FIGS. 5, 6 and 7, where a snap fit locking arrangement provides a more secure means for joining the bottom with the side walls.

To assemble the invention, container 34 is placed on bottom disc 32, and the sleeve assembly of FIG. 4 is squeezed at the junctions of side walls 12 and 14 to form an approximately circular cylinder. This cylinder is placed over container 34 and bottom disc 32 and released. Top lid 26 is then put in place and tape hinge 28 is fastened opposite lip seal 30. Top lid 26 is then flipped back to allow a person to drink, or flipped forward to seal the top of insulator 10.

After consumption of the contents of container 34, insulator 10 can be disassembled for later reuse. To remove insulator 10, the sides are squeezed along insulating strip 18 and 20 after top lid 26 is flipped back to the open position. Container 34 is pressed downwardly to release bottom 32, and container 34 is then pushed upwardly and lifted from the remaining sleeve.

The invention is simple and economical to manufacture, and very convenient to use. It keeps cold drinks chilled much longer than without use of the device. Therefore, use of the device will conserve on ingredients used to make cold drinks, and the collapsibility of the sleeve assembly makes packaging easy. The semi-rigid material in the sleeve holds the bottom in place and keeps the can or container from slipping out from insulator 10. The device is usable with cans which vary slightly in size without the requirement for a different sized insulator.

Top lid 48 differs from top lid 26 in two respects. First, top lid 48 has a top lid 60 which extends over the edge of side walls 12 and 14 to improve the insulating quality and appearance of insulator 10. Second, top lid 48 has provision for a drinking straw through straw acceptor hole 50.

Further advantages of the invention reside in the fact that insulating material forming side walls 12 and 14, top lid 26 or 48, and bottom disc 32 or 38 will present an external surface held at a temperature approaching the ambient temperature, due to its insulating properties, when container 34 holds a chilled liquid. As is well known, under many circumstances of use, moisture condensation occurs when chilled beverages are exposed to outside ambient air. This condition can lead to inconvenience to the consumer, dripping or staining of a table surface upon which the container is placed, and even more rapid warming of the container contents due to absorption of the heat of vaporization represented by such condensation of water. Since the temperature of the surface presented by the insulation of the present invention will be near the ambient temperature, and will ordinarily be well above the dew point, such condensation and attendant problems are avoided. When bottom disc 32 or 38 is made of a soft material, or the outer surface so provided, scratching of a table surface is also prevented.

For outdoor use, the invention offers additional advantages. Foreign matter can be excluded from the beverage container by use of the invention. Breakage, such as could occur with certain vacuum insulated container, is both less likely and the consequences less significant even if breakage or loss does occur, due to the relatively inexpensive nature of the present invention. Moreover, the insulating properties of the invention minimizes the warming effect on chilled container contents by incident solar radiation, since only the surface of the insulating material will be warmed thereby, with relatively little heat transfer into the chilled contents in view of the thermal insulating properties of the insulator material of the invention.

The forgoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:
1. An insulator for a cylindrical can adapted for holding liquid contents, the insulator comprising thermal insulating means removably enclosingly surrounding the cylindrical can, said insulating means having opening means for exteriorly gaining access to the cylindrical can, the thermal insulating means comprising a pair of joined collapsible side walls formable into a cylindrical sleeve, an insulating bottom, and a removable insulating top lid which comprises said opening means, the insulating bottom being fittingly receivable into the cylindrical sleeve and the insulating top lid being attachable to the opposite end of the cylindrical sleeve, whereby said liquid contents are maintainable at a temperature above or below ambient temperatures, and whereby damage to a surface on which the container rests is preventable.

2. The insulator of claim 1 wherein said side walls are joined on the outside thereof by insulating strips having an insulating foam in the gap between said insulating strip and said side walls.

3. The insulator of claim 2, wherein one of said side walls has a cut-out portion disposed along its top for exteriorly gaining access to said container, and said top has a depending lip seal covering said cut-out portion.

4. The insulator of claim 3 wherein said top lid is attached by a tape hinge to the side wall opposite said cut-out portion and has a straw acceptor hole for receiving a drinking straw passing therethrough, the top lid further having a lip extending beyond said side walls for improving the insulating quality of the insulator.

5. The insulator of claim 4 wherein said bottom has a lip extending beyond said side walls for improving the insulating quality and appearance of the insulator, and the bottom has an undercut ridge for snap fitting into a kerf within the lower rim of said side walls.

6. An insulator for a generally cylindrical liquid container, the insulator comprising a pair of joined collapsible side walls expandable into a cylindrical sleeve, the side walls being joined by insulating strips having an insulating foam in the gap between the insulating strip and the side walls, the side walls having a lower periphery into which an insulating bottom is removably insertable and fittable, the side walls having an openable insulating top lid attachable to the side walls and openable to provide access through the insulator to the contents of the container, the top lid being attachable to the side walls by a tape hinge enabling opening and closing of the top lid on the side walls, the insulating bottom being constructed of a soft material to prevent scratching of a table surface on which the insulator is restable, the side walls, insulating bottom and insulating top lid being constructed of a material having insulating properties to minimize transfer of heat therethrough and to minimize the warming effect on said contents by incident solar radiation, the collapsible side walls having a springiness or tendency to collapse when assembled, whereby axial gripping force is exerted on the insulating bottom to retain the insulating bottom by friction, the insulating bottom being provided with three circumferential ridges including a lowermost, middle, and uppermost ridge, the middle ridge being undercut to provide a snap fit with said side walls, the side walls having a lower gripping kerf for receiving the middle ridge.

7. The insulator of claim 6 wherein said top lid has a straw acceptor hole for receiving a drinking straw passing therethrough.

* * * * *